United States Patent

Djafer et al.

[11] Patent Number: 5,972,226
[45] Date of Patent: Oct. 26, 1999

[54] PROCESS AND INSTALLATION FOR THE TREATMENT OF EFFLUENTS BY OXIDATION AND DENITRIFICATION IN THE PRESENCE OF A HETEROGENEOUS CATALYST

[75] Inventors: Malik Djafer, Boulogne Billancourt; Francis Luck, Noisy Le Grand; Jacques Sibony, Paris, all of France

[73] Assignee: Omnium de Traitements et de Valorisation, Saint Maurice Cedex, France

[21] Appl. No.: 08/817,338
[22] PCT Filed: Oct. 6, 1995
[86] PCT No.: PCT/FR95/01308
  § 371 Date: Aug. 25, 1997
  § 102(e) Date: Aug. 25, 1997
[87] PCT Pub. No.: WO96/13463
  PCT Pub. Date: May 9, 1996

[30] Foreign Application Priority Data

Oct. 27, 1994 [FR] France ................... 94 13100

[51] Int. Cl.[6] .................. C02F 1/72; C02F 1/76; C02F 1/78; A62O 3/00
[52] U.S. Cl. .............. 210/762; 210/754; 210/756; 210/759; 210/760; 210/763; 588/205
[58] Field of Search ................ 210/758, 763, 210/764, 762, 754, 756, 759, 760; 423/499; 588/205

[56] References Cited

U.S. PATENT DOCUMENTS

| | | |
|---|---|---|
| 4,052,302 | 10/1977 | Fletcher et al. ............ 210/63 R |
| 4,141,828 | 2/1979 | Okada et al. ............ 210/63 R |
| 4,525,283 | 6/1985 | Hurak et al. ............ 210/762 |
| 4,699,720 | 10/1987 | Harada et al. ............ 210/762 |

FOREIGN PATENT DOCUMENTS

| | | |
|---|---|---|
| 0 196 597 A2 | 3/1986 | European Pat. Off. . |
| 2361308 | 4/1977 | France . |
| 244008 | 12/1979 | France . |

Primary Examiner—Gary P. Straub
Attorney, Agent, or Firm—Coats & Bennett, P.L.L.C.

[57] ABSTRACT

The invention relates to a process of aqueous phase oxidation of effluents, consisting of subjecting said effluents to oxidation in the presence of at least one catalyst and of at least one oxidising agent, at a temperature of between approximately 20° C. and approximately 350° C., under a total pressure of between approximately 1 and approximately 160 bars, in such manner as to mineralise part of the organic matter and total ammoniated nitrogen contained in said effluents, said oxidation being carried out inside a reactor in which a gaseous phase is set up above the liquid phase consisting of said effluents.

characterized in that said catalyst is a heterogeneous catalyst placed inside said reactor above the interface between said gaseous phase and said liquid phase.

23 Claims, 5 Drawing Sheets

PROCESS AND INSTALLATION FOR THE TREATMENT OF EFFLUENTS BY OXIDATION AND DENITRIFICATION IN THE PRESENCE OF A HETEROGENEOUS CATALYST

The area of the invention is the treatment of industrial or urban effluents containing organic matter and nitrogen compounds.

More generally the invention relates to the treatment of effluents which contain organic matter and organic and inorganic compounds of nitrogen, such as waste lixiviation products, farm excrements, chemical industry effluents (dyes, explosives, anilines, nicotinic acid, polyamides etc.) effluents of agro-food industries, treatment plant sludge, output effluents from treatment sludge packaging and dehydration etc..

The treatment concerned consists of removing from the effluents to be treated a substantial part of the undesired compounds they contain so that they can be discharged into a natural receiving environment, a treatment facility or a collector network. The effluent considered may be water or any other fluid liquid.

The methods conventionally used to treat urban or industrial effluents use biological processes intended to reduce their biological oxygen requirements (BOR) and their content of nitrogenous nutrients and phosphorus. However, certain effluents containing pollutants that are not easily biodegradable and have high ammonia contents require the use of special processes and/or necessitate the additional use of chemical substrates for their treatment.

One effective treatment adapted to the elimination of chemical oxygen requirements (COR) is aqueous phase oxidation which has been described at length in the prior art. The objective of this technique is to carry out extended oxidation of organic matter that is little biodegradable contained in aqueous effluents through the contact of said effluents with an oxidising agent. For this purpose the operating conditions of said process typically lie between approximately 20 and approximately 350° C. regarding temperature and between approximately 1 and approximately 160 bars in respect of pressure.

Aqueous phase oxidation processes do not allow substantial elimination of ammoniated nitrogen, particularly when the effluents to be treated contain high concentrations of ammoniated nitrogen (>200 mg/l). Even oxidation under wet conditions (Wet Air Oxidation) which is one of the best performing oxidation processes, generally carried out at a temperature of between approximately 200° C. and approximately 350° C. and a pressure generally lying between approximately 20 and approximately 160 bars, only achieves limited removal of ammoniated nitrogen with yields of 5% to 10% whereas organic carbon is destroyed with efficacy in the region of almost 80%. Numerous publications have shown that the treatment of industrial or urban effluents by wet air oxidation only achieves very partial elimination of total Kjeldahl nitrogen of between 5 and 15% and that on completion of treatment the latter is essentially in ammoniated nitrogen form.

Physical processes also exist for the removal of ammoniated nitrogen. Air or steam stripping, effective for high contents, requires considerable investment and is ill-adapted to the treatment of effluents which also contain high concentrations of organic matter. Also, it only achieves ammonia conversion by concentrating it. With this type of process the ammonia is removed by neutralisation with sulphuric acid to form ammonium sulphate which has to be stored before being put to further use, which constitutes an additional operating charge. With treatment by wet air oxidation for example this operation can only be carried out after leaving the effluent to settle, cooling to a temperature of less than 80° C. and adjusting pH in order to prevent simultaneous release of volatile, foul smelling and/or harmful organic compounds during forced aeration at a higher temperature. This treatment of ammoniated nitrogen subsequent to wet air oxidation leads to much increased investment and operating costs.

In treatment plants the removal of ammoniated nitrogen may also be made by biological nitrification-denitrification treatment. This treatment does not easily accept high loads.

If the effluent has sufficiently high COR content it is possible to carry out simultaneous removal of organic matter and of organic and inorganic nitrogen compounds by incineration. This technique leads to the formation however of a large quantity of NOx nitrogen oxides (x=1 and 2), by oxidation of a substantial part of the nitrogenous load. In order to comply with NOx release standards therefore, it is necessary to treat incineration fumes, in particular by catalytic reduction of NOx by NH3, a technique which is expensive to set in operation.

It is also possible to reinforce the efficacy of wet air oxidation for the removal of ammoniated nitrogen through the use of heterogeneous catalysts in contact with the effluent to be treated, made up for example of titanium dioxide, a rare earth oxide and a precious metal oxide such as described in European Patent EP-A431 932, or in American Patent U.S. Pat. No. 3,988,259. However, such catalysts have the disadvantage of showing substantial loss of activity with time due to the fact that they are immersed during use. A further disadvantage of catalytic wet air oxidation arises from the fact that the heterogeneous catalyst may be affected by the precipitation in its structure of calcium carbonates and sulphates and of metals present in traces in the effluents such as mercury, cadmium, lead, zinc etc. which are known poisons for numerous catalysts by acting to form combinations or alloys in particular with precious metals. All these disadvantages mean that the process of wet air oxidation is not currently used to treat effluents.

It will also be noted that as no catalysts are used for processes such as wet air oxidation for example, this leads to gaseous ammonia being carried by treatment gases which causes the formation of ammonium salt deposits such as ammonium sulphate, ammonium acetate etc. These deposits may lead to fouling of essential parts such as conduits and valves.

The purpose of this invention is to provide a process for the oxidation of effluents in aqueous phase which will remedy the disadvantages of the current state of the art. More precisely, the purpose of the present invention is to provide a process for treating industrial or urban effluents containing organic matter and organic and inorganic nitrogen compounds which achieves substantial removal of total ammoniated nitrogen and simultaneously achieves a substantial decrease in the COR of said effluents and in the release of harmful or foul smelling gases.

A further objective of the invention is to provide a process and installation which allows disadvantage-free use of heterogeneous catalysts for wet air oxidation processes.

Yet another objective of this invention is to describe a process which will substantially increase the life of such heterogeneous catalysts.

A further objective of the invention is to improve the efficacy of aqueous phase oxidation processes and to reduce the costs incurred for their implementation.

These objectives and others which will be described later are achieved with this invention which relates to a process of aqueous phase oxidation of effluents, which consists of subjecting said effluents to oxidation in the presence of at least one catalyst and of at least one oxidising agent at a temperature of between approximately 20° C. and approximately 350° C. under a total pressure lying between approximately 1 and approximately 160 bars, in such manner as to mineralise part of the organic matter and total ammoniated nitrogen contained in said effluents, said oxidation being carried out inside a reactor in which a gaseous phase is set up above the liquid phase consisting of the effluents characterized in that said catalyst is a heterogeneous catalyst placed inside said reactor, above the interface between said gaseous phase and said liquid phase.

With said process it is possible to remove total ammoniated nitrogen by oxidation in $N_2$ molecular nitrogen without forming NOx nitrogen oxides(x=1 or 2).

The catalyst used in this way is also able to achieve simultaneous removal of the carbon monoxide CO usually formed during wet air oxidation through oxidation into carbon dioxide, and the removal of volatile organic compounds by oxidation into carbon dioxide and water.

It was found, in surprising manner, that such positioning of the catalysts inside the reactor allowed the removal with great efficacy of both ammoniated nitrogen and CO which in turn allowed release of the residual gas into the atmosphere with no complex subsequent treatment. In unexpected manner, the transfer of ammoniated nitrogen to the gaseous phase of the reactor, as far as the catalysts in view of oxidation, is sufficiently efficient to avoid having to proceed with pH adjustment to higher levels as is the case with forced aeration.

The position of the heterogeneous catalyst above the interface between the gaseous and liquid phases in the oxidation reactor also avoids the use of costly catalysts able to resist against the corrosive conditions of the liquid phase, and also avoids any risk of particle fouling of the catalyst and any risk of loss of activity of the catalysts by dissolution of its active phase or by reaction with contaminants present in the liquid phase.

According to a variant of interest of this invention, the process is set in operation at a temperature of between approximately 200° C. and 350° C. under a total pressure of between approximately 20 and approximately 160 bars. It therefore constitutes a process of wet air oxidation.

Preferably, said heterogeneous catalyst is a metal belonging to the group made up of vanadium, niobium, chromium, molybdenum, tungsten, manganese, iron, cobalt, nickel, copper, cerium, platinum, rhodium, palladium, ruthenium and iridium and the mixtures and compounds of one or more of these.

The catalyst may advantageously be placed on a mineral support made up for example of an oxide such as alumina, silica, zeolites, titanium dioxide, zirconium etc.

The catalyst may be prepared by any other means known to men of the art, in particular by impregnation of a porous support with a solution of one or more compounds of metals producing metals or metallic oxides by heat activation, or by a mixture of an oxide support and one or more metal compounds then given form by extrusion, pelleting, granulation, compressing etc.

The catalyst of the invention may be in the form of beads, drops, cylindrical or polylobate extrudates, rings, ceramic or metallic honeycombs, or any other form appropriate for setting up a fixed catalyst bed placed in the wet air oxidation reactor above the interface between the gaseous and liquid phases. Preferably, metallic honeycombs are used as they have the combined advantages of being cheap, easy to use, easy to lock into position inside the reactor and easy to move inside the reactor.

As specified above, oxidation in aqueous phase is carried out in a reactor operating continuously or intermittently at a temperature of between approximately 20° C. and approximately 350° C. under a total pressure lying between approximately 1 bar and 160 bars. To perform said oxidation at least one oxidising agent is used chosen from among air, oxygen enriched air, oxygen, ozone, hydrogen peroxide, peracids, gaseous chlorine, chlorine dioxide, sodium hypochlorite, potassium permanganate or any other oxidising agent known to men of the art.

If the oxidising agent used is placed in the treatment reactor in liquid or solution form, as for example hydrogen peroxide, sodium hypochlorite, potassium permanganate etc . . . the invention preferably comprises a gas flow into the reactor made up of at least one agent chosen from among air, oxygen enriched air, oxygen, ozone, water steam or nitrogen gas.

Catalytic oxidation is carried out at a temperature of between approximately 200° C. and approximately 350° C., preferably between 250° C. and 300° C. When setting in operation a process of wet air oxidation, positioning of the catalyst inside the reactor, owing to the temperature prevailing inside said wet air oxidation reactor (between 200° C. and 350° C.) proves to be highly effective in carrying out oxidation reactions of $NH_3$ into $N_2$ and $N_2O$, of CO into $CO_2$ and of volatile organic compounds into $CO_2$ and $H_2O$ without the need to heat the gases as in the case of treating said gases in an additional reactor located outside the wet air oxidation reactor. Also, since the different oxidation reactions catalysed in this way are highly exothermic, the heat emitted by said reactions is for the most part transmitted by radiation, conduction and convection to the entire reactor which improves its thermal output and in particular enables treatment of more diluted effluents containing less COR without the need to supply additional calories to balance the overall thermal output of the oxidation process according to a variant of interest of this invention, this catalytic oxidation temperature may be higher than the oxidation temperature in aqueous phase. It will then be possible not to bring the entire inside of the reactor up to catalytic oxidation temperature but only the area in which this catalytic oxidation takes place, which means that lower pressures can be used for oxidation in aqueous phase. To set in operation said variant of the invention, specific heating means are used to heat the catalytic oxidation area, which are placed at the same level as the area of the reactor in which the heterogeneous catalyst is positioned. These means may in particular be made up of a heating collar placed on the outside surface of the reactor. The catalytic oxidation area may also be heated using the Joule effect. Heating the catalytic oxidation area to a temperature that is higher than that of the liquid effluent also has the advantage of avoiding any condensation of said effluent.

According to a variant of the process, said oxidation in aqueous phase may be carried out in the presence of a homogeneous catalyst intended to increase the efficacy of COR reduction. According to said variant, oxidation is therefore carried out in the presence of two catalysts, a heterogeneous catalyst placed above the interface between the gaseous phase and the liquid phase, and a homogeneous catalyst.

Preferably, said catalyst is a metal belonging to the group made up of manganese, iron, cobalt, nickel, copper, zinc and the mixtures and compounds of one or more of these. In particularly advantageous manner, a soluble compound of copper is used (such as copper sulphate) or of zinc or their mixture, the mass ratio of catalyst metal/chemical oxygen requirements (COR) of the effluent before treatment lying preferably between approximately $5 \cdot 10^{-4}$ and $3 \cdot 10^{-1}$.

It will also be noted that another catalyst may be used placed at the exit of the reactor, for example for additional treatment of the carbon oxide and of volatile organic compounds.

For continuous operation reactors, it may prove to be advantageous to recycle at least part of said gaseous phase in said aqueous phase oxidation reactor, in such manner as to ensure sufficient contact time to obtain substantial removal of $NH_3$, CO and volatile organic compounds usage a heterogeneous catalyst placed inside said reactor.

According to a further variant of the process, the effluent treated comprises a solid phase, and the process comprises a stage consisting of recycling at least part of the solid phase present in the oxidation reactor. This stage provides sufficient contact time to ensure oxidation of the organic part of this solid phase.

Also according to a variant of interest of this invention, the process comprises a stage consisting of adjusting the pH of said effluents to a value of 7 to 12. It was observed that said adjustment increased the efficacy of catalytic oxidation of ammonia without increasing the formation of nitrogen oxides.

The invention relates to any reactor for aqueous phase oxidation of a liquid effluent by an oxidising agent, characterised in that it comprises means of holding a heterogeneous catalyst above the surface of said liquid effluent.

Also preferably, said reactor includes means adjusting the position of said holding means, in such manner as to be able to adjust the height between the catalyst and the surface of the liquid effluent inside the reactor. This height may vary in relation to the type of effluent to be treated, particularly in relation to whether or not stirring means are provided within the reactor.

According to a variant the reactor comprises a devesiculator between the liquid phase and the catalyst.

The invention and the different advantages it offers will more clearly understood on reading the description of the five examples of embodiment (examples 2 to 6) given below with reference to a comparative example which does not use the characteristics of the invention (example 1) and with reference to the drawings in which.

EXAMPLE 1 (not representative of the invention)

In a first series of tests wet air oxidation is examined of a liquid effluent having the following characteristics:
COR: 34.6 g/l
N-NH4 content: 1.89 g/l
pH: 5.41

This effluent is placed in an autoclave reactor in the presence of an oxygen/COR stoichiometry of 1.5, at a temperature of 235° C. and under a total pressure of 46 bars with a reaction time of 10 min. For comparison with a test without heterogeneous catalyst, catalysts containing precious metals are placed inside the autoclave on an alumina support in cylindrical drop form (2.8 mm×3.5 mm) comprising respectively 0.5% ruthenium (615 mg of type 146 catalyst produced by Johnson Matthey), 0.5% platinum (610 mg of type 73 catalyst produced by Johnson Matthey) and 5% palladium (110 mg of type 49 catalyst produced by Johnson Matthey).

The following COR and N-NH4 values were noted at the end of the test.

|  | Without catalyst | 0.5% Ru | 0.5% Pt | 5% Pd |
|---|---|---|---|---|
| COR (g/l) | 31.9 | 31.0 | 28.0 | 30.3 |
| COR red. (%) | 7.8 | 10.4 | 19.0 | 12.4 |
| N—NH4 (g/l) | 2.28 | 2.10 | 1.67 | 2.33 |
| N—NH4 red (%) | −17.3 | −11.3 | −11.3 | −23.6 |

It is observed that the presence of Ru and Pd based catalysts does not significantly alter reductions of COR and ammoniated nitrogen. On the other hand, the Pt based catalyst leads to a COR reduction of 19% and removal by oxidation of 11% of ammoniated nitrogen. However, after a reaction time of 10 min, all the catalysts used lost most of their precious metal content through suspension in the solution further to shock and friction due to stirring of the effluent in the reactor required for reaction purposes. Although it shows some efficacy in removing ammonia, the platinum based heterogeneous catalyst placed in the liquid effluent to be treated does not show sufficient long-lasting properties for industrial use.

EXAMPLE 2

In a second series of tests wet air oxidation of sludge from a treatment plant with the following characteristics was examined:
matter in suspension: 40.7 g/l
volatile matter: 60.7%
COR: 48.7 g/l
N-NH4 content: 0.938 g/l
pH: 6.3

Figure 4:
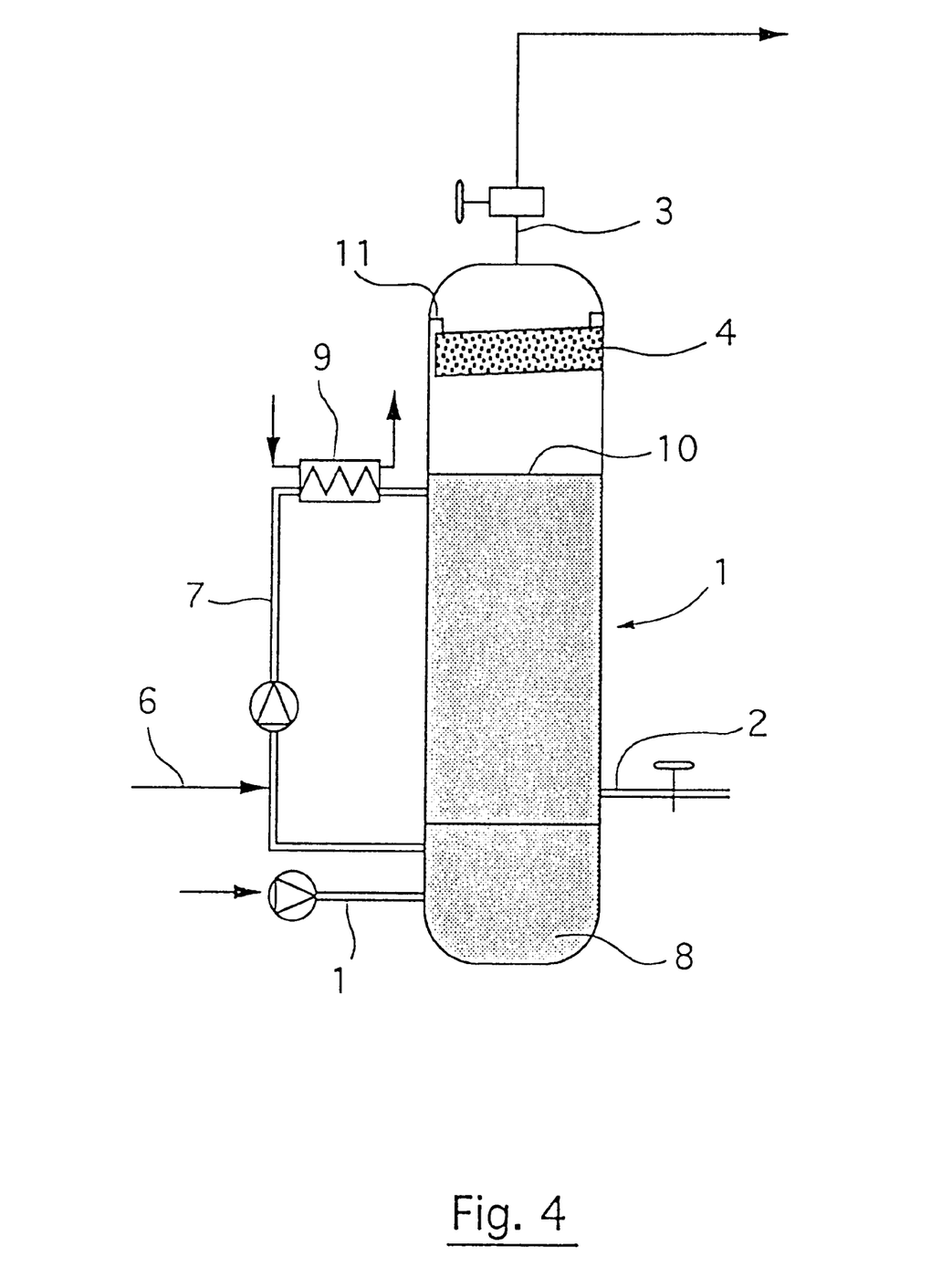
FIG. 4 represents a first embodiment of a reactor in accordance with the present invention.
Figure 5:
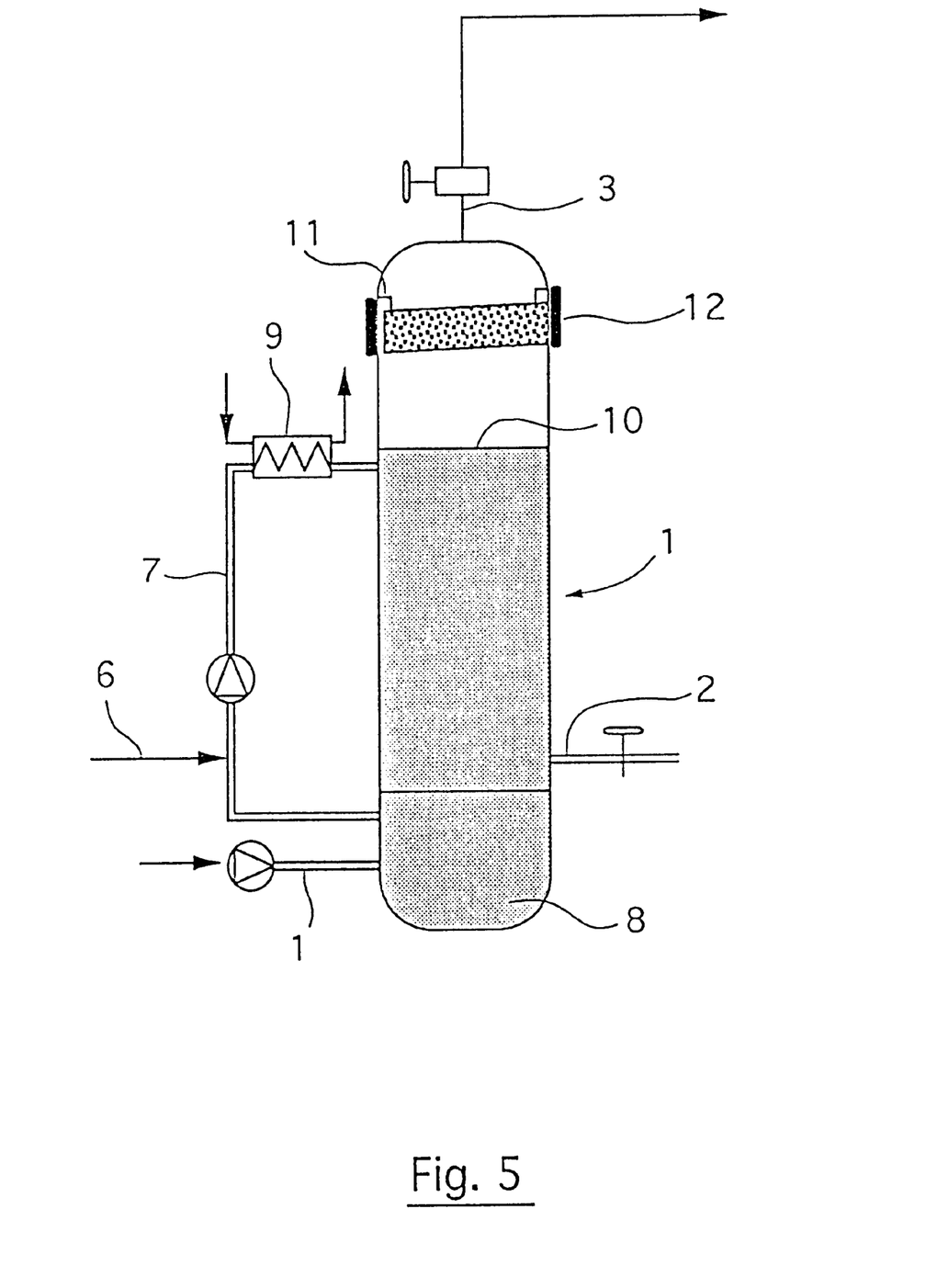
FIG. 5 represents a second embodiment of a reactor in accordance with the present invention.

This sludge is placed in a wet air oxidation reactor according to the present invention as shown in FIG. 4.

The reactor is supplied with effluent to be treated by injection pipe 1. This reactor is fitted with heating means able to bring the effluent to a temperature lying between approximately 100° C. and 350° C. Pressurising means are provided to bring the effluents to be treated in the reactor under a pressure of between approximately 5 bars and approximately 160 bar.

In conventional manner, the reactor is fitted with two pipes 2 and 3:

an outlet pipe 3 to discharge a water saturated gaseous phase, an outlet pipe 2 to discharge an essentially liquid phase chiefly containing residual soluble organic matter and an essentially mineral solid phase in suspension.

The injection of oxygen 6 is made by a sludge recirculation loop 7 from base 8 of reactor 1 towards its upper part. This layout is advantageous but not compulsory. It is also possible to inject oxygen into another part of the reactor. A heat exchanger 9 is provided to recover and return the calories from treated effluents with a view for further use, for example, to preheat the effluent to be treated.

In accordance with the essential characteristic of the invention, a heterogeneous catalyst is placed in a basket container 4 above interface 10 between the liquid phase and the gas phase present in the reactor in such manner as to leave between said interface 10 and said catalyst a security volume which will prevent or at least minimise contact of said effluent with said catalyst. This security volume is obtained by maintaining sufficient partial pressure above the liquid while maintaining the latter at a given level. Means 11 made up of notches on the inner wall of the reactor are provided to change the position of said basket container.

Under the present example, the sludge is placed in this reactor under an oxygen/COR stoichiometry of 1.5, at a temperature of 235° C. and under a total pressure of 38 bars. For comparison with tests without a heterogeneous catalyst, a heterogeneous catalyst in accordance with the present invention is placed in the autoclave. The catalyst used is a catalyst containing 0.5% platinum on an alumina support in the form of cylindrical drops (2.8 mm×3.5 mm, type 73 catalyst produced by Johnson Matthey) contained in a grid basket container placed horizontally approximately 30 cm above the liquid-gas interface at rest (no stirring).

Certain tests are carried out by adding to the sludge to be treated a homogenous catalyst (copper sulphate with a copper content of 500 mg/l), a catalyst intended to accelerate COR reduction.

Figure 1:
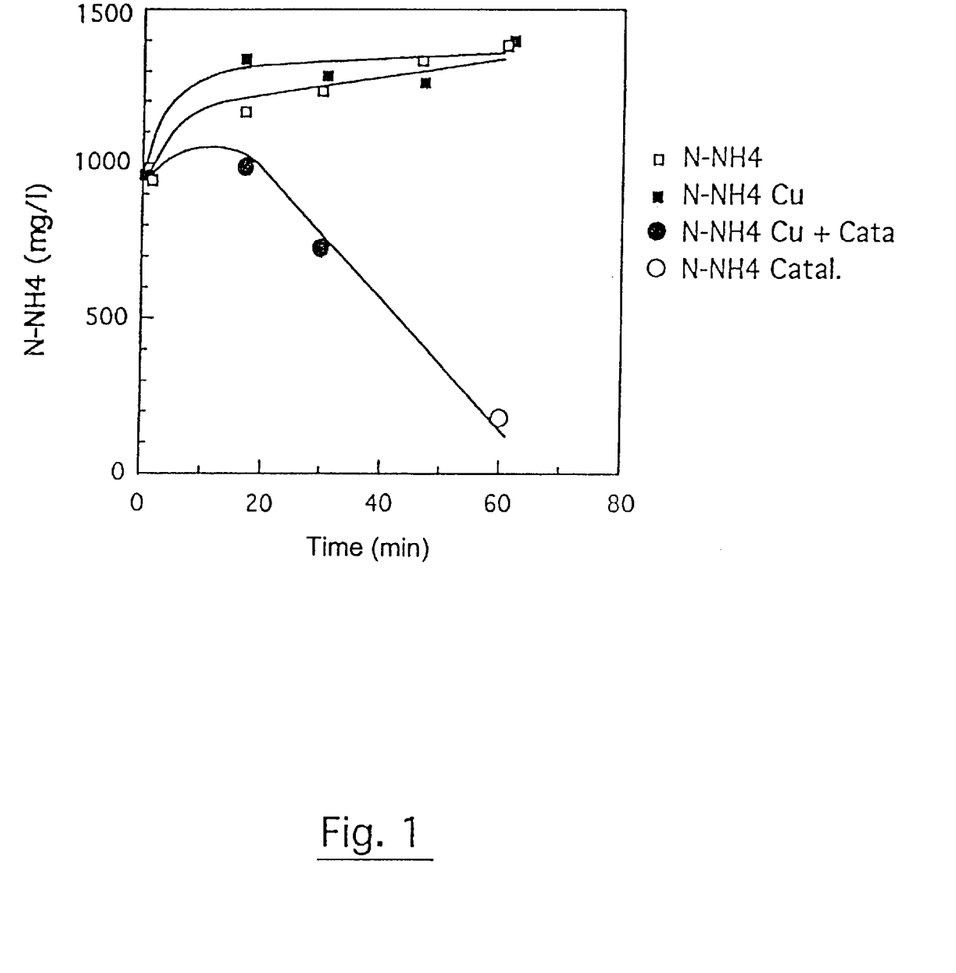
FIG. 1 represents the formation and reduction of ammoniated nitrogen in relation to treatment time, to the presence of a homogeneous catalyst (Cu) and a heterogeneous catalyst (Pt catalyst) at 235° C. and 38 bars.

The results given in FIG. 1 show that the homogeneous copper catalyst used alone (with no platinum based heterogeneous catalyst) only accelerates the conversion kinetics of organic nitrogen (amino acids, peptides, proteins . . . ) into ammoniated nitrogen but does not contribute to removing ammoniated nitrogen by oxidation compared with a test without copper. On the contrary, the 3 tests carried out in the presence of the platinum catalyst show substantial reduction of ammoniated nitrogen of up to 86% after a reaction time of 1 hour.

Figure 2:
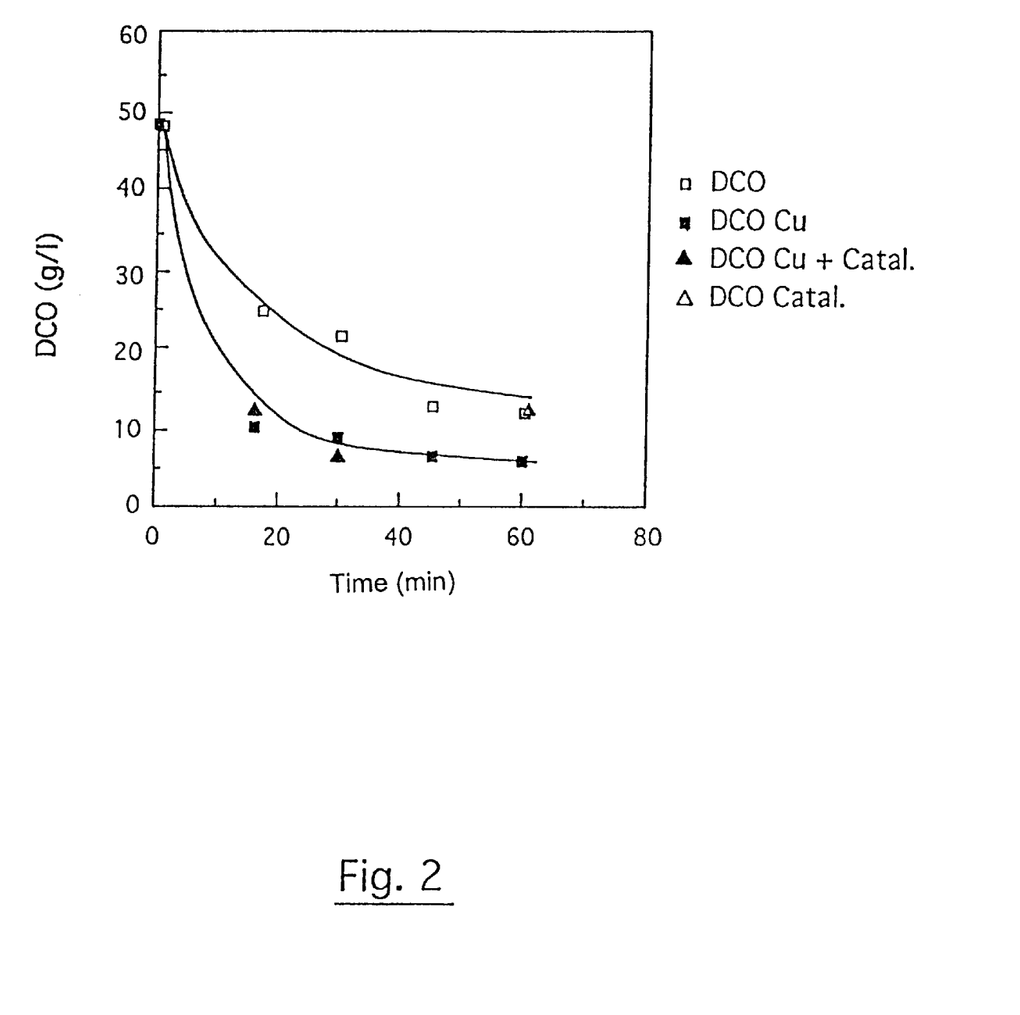
FIG. 2 represents COR reduction in relation to time and to the presence of a homogeneous catalyst (copper) and a heterogeneous catalyst (platinum)

It is observed from the results given in FIG. 2 that the presence of the platinum catalyst does not in any way affect COR reduction during the wet air oxidation reaction. Unlike the prior art, and in particular the disclosures of EP patent 431 932, according to which the presence of a heterogeneous catalyst, for example containing platinum, in contact with the effluent increases the removal rate of COR and ammoniated nitrogen, the use of the heterogeneous catalysts of the invention leads to extended nitrogen removal without affecting COR decline in any way.

It is therefore possible for example in the case of a residual water treatment plant, by using wet air oxidation treatment, to remove total ammoniated nitrogen from sludge and to produce an effluent made up chiefly of volatile fatty acids, alcohols and ketones, said effluent forming a very efficient carbonated source to remove the nitrogen contained in the effluent entering the plant by biological denitrification.

EXAMPLE 3

In a third series of tests, wet air oxidation of sludge from a treatment plant is examined, the sludge having the following characteristics:
matter in suspension: 40.7 g/l
volatile matter: 60.7%
COR: 48.7g/l
N-NNH4 content: 0.938 g/l
pH: 6.3

This sludge is placed in the reactor described in FIG. 4 in the presence of an oxygen/COR stoichiometry of 1.5, at a temperature of 235° C. and under a total pressure of 38 bars, with a reaction time of 15 min. For comparison with tests with no heterogeneous catalyst, the same load of catalyst containing 0.5% platinum as used for the second series of tests is placed in the autoclave in a grid basket container positioned either horizontally approximately 30 cm above the liquid-gas interface at rest (test H3) or vertically approximately 80 cm above the liquid-gas interface at rest (test V8). Certain tests are carried out by adding to the sludge to be treated a homogeneous catalyst (copper sulphate, with a copper content of 500 mg/l)) a catalyst intended to accelerate COR decrease. Optionally the initial pH of the sludge (6.3) is adjusted to a value of 10 by adding a soda solution.

The results in Table 1 show that the increase of the initial pH of the sludge increases the catalytic oxidation efficacy of ammonia and that there is no significant formation of NOx nitrogen oxides, which would become soluble in the effluent treated in the form of $NO_2$- nitrite and $NO_s$-nitrate ions.

TABLE I

| Catalysts | Initial pH | Final pH | Contact time (min) | N—NH4 (mg/l) | N—NO2 (mg/l) | N—NO3 (mg/l) |
|---|---|---|---|---|---|---|
| — | 6.3 | 7.660 | 0 | 1407 | 12 | n.d. |
| Pt (H3) | 6.3 | 4.560 | 15 | 189 | 15 | 0.2 |
| Pt (H3) | 6.3 | 5.860 | 15 | 126 | 25 | 0.7 |
| Cu | 6.3 | 6.515 | 15 | 1361 | 4.5 | n.d. |
| Cu,Pt (V8) | 6.3 | 6.115 | 15 | 867 | 9 | 0.4 |
| Cu,Pt (V8) | 10.0 | 6.815 | 15 | 696 | 8 | 0.3 | n.d.: not determined

EXAMPLE 4

In a fourth series of tests wet air oxidation of an effluent derived from a thermal sludge packaging process is examined which has the following characteristics:
COR: 9.4 g/l
N-NH4 content: 1.52 g/l
pH: 7.85

This effluent is placed in an autoclave reactor in the presence of an oxygen/CIR stoichiometry of 1.5, at a temperature of 235° C. under a total pressure of 35 bars with a reaction time of 15 min/ For comparison with a test with no heterogeneous catalyst, the same load of catalyst containing 0.5% platinum already used for the second and third series of tests, is placed in the autoclave vertically approximately 80 cm above the liquid-gas interface at rest.

TABLE 2

| Catalysts | Initial pH | Final pH | Contact time (min) | N—NH4 (mg/l) | N—NO2 (mg/l) | N—NO3 (mg/l) |
|---|---|---|---|---|---|---|
| — | 7.85 | 7.85 | 0 | 1521 | 323 | |
| Cu,Pt (H3) | 7.85 | 6.7 | 15 | 720 | 117 | |
| Cu,Pt (H3) | 10.0 | 7.6 | 15 | 600 | 116 | |

The results given in Table 2 confirm that the increase of the initial pH of the effluent from 7.85 to 10.0 increases the efficacy of the catalytic oxidation of ammonia and that there is no significant increase in the total oxidised forms of nitrogen, $NO_{2-}$ nitrite and $NO_{3-}$ nitrate in the effluent treated.

EXAMPLE 5

Figure 3:
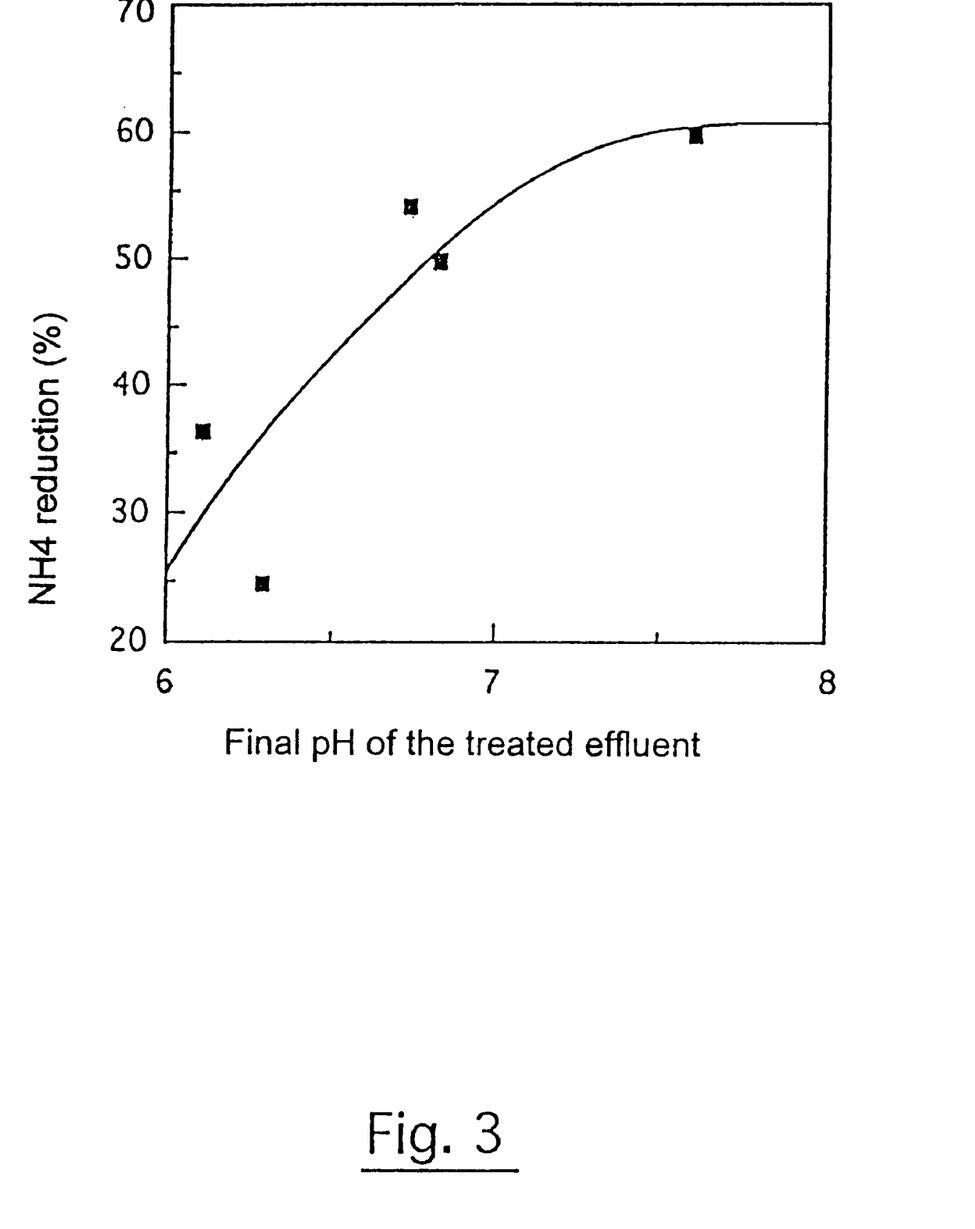
FIG. 3 represents the influence of the final pH of the treated effluent on the percentage of removal of ammoniated nitrogen.

FIG. 3 shows the effect of the final pH of the treated effluents on the percentage of removal of ammoniated nitrogen in the different tests made in the presence of an oxygen/COR stoichiometry of 1.5, at a temperature of 235° C. for 15 minutes under a total pressure of 38 bars in the presence of a homogeneous catalyst (copper sulphate with a copper content of 500 mg/l) and a catalyst load containing 0.5% platinum contained in a grid basket container placed either horizontally approximately 30 cm above the liquid-gas interface at rest (test H3) or vertically approximately 80 cm above the liquid gas interface at rest (V8). Optionally the initial pH of the effluent is adjusted to a value of 10 by adding a soda solution.

These results confirm that the removal of ammoniated nitrogen is helped by an increase in the effluent's pH;

EXAMPLE 6

In this test wet air oxidation of an effluent is examined which contains the following compounds:

Urea ($NH_2CONH_2$: 0.026 mol/l)

Hexamethylenetetramine or HTM ($C_6H_{12}N_4$): 0.036 mol/l)

COR: 7.6 g/l

This effluent is placed in a reactor in the presence of an oxygen/COR stoichiometry of 1.5 at a temperature of 285° C. under a total pressure of 86 bars with a reaction time of 10 min. For comparison with a test with no heterogeneous catalyst, a precious metal based catalyst is placed in the autoclave on an alumina support in cylindrical honeycomb shape comprising 0.5% platinum.

TABLE 3

|  | Initial solution | Treatment with no catalyst | Treatment with catalyst |
| --- | --- | --- | --- |
| COR g/l | 7.6 | 0.4 | 0.03 |
| N—NO3 g/l | — | 0.008 | 0.075 |
| N—NO2 g/l | — | 0 | 0.04 |
| N—NH4 g/l | — | 2.76 | 0.045 |
| pH | 7.5 | 9 | 6 |

The results obtained (see Table 3) show that in the presence of a catalyst, the percentage of ammonia removal reaches 98% and that there is no significant increase in the total oxidised forms of nitrogen, $NO_{2-}$ nitrite and $NO_{3-}$ nitrate, in the treated effluent.

EXAMPLE 7

In this test, wet air oxidation of an effluent is tested which contains the following compounds:

Urea ($NH_2CONH_2$): 0.0335 mol/l

Amino-4-benzenesulfonamide ($C_6H_8N_2O_2S$): 0.0697 mol/l

COR: 11.4 g/l pH: 6.8

This effluent is placed in an autoclave reactor in the presence of an oxygen/COR stoichiometry of 1.5, at a temperature of 285° C. under a total pressure of 86 bars with a reaction time of 10 min. For comparison with a test with no heterogeneous catalyst, a catalyst containing precious metals is placed in the autoclave on an alumina support in cylindrical honeycomb form comprising 0.5% platinum.

TABLE 4

|  | Initial solution | Treatment with no catalyst | Treatment with catalyst |
| --- | --- | --- | --- |
| COR g/l | 11.4 | 0.5 | 0.24 |
| N—NO3 g/l | — | 0.002 | 0.010 |
| N—NO2 g/l | — | 0 | 0.010 |
| N—NH4 g/l | — | 1.8 | 0.34 |
| pH | 6.8 | 8.3 | 2.1 |

The results obtained (Table 4) show that the presence of the catalyst allows ammonia to be removed with a yield of 81% and that there is no significant increase in the total oxidised forms of nitrogen, $NO_{2-}$ nitrite and $NO_{3-}$ nitrate, in the treated effluent.

All the results given above clearly show the numerous advantages related to the use of an effluent treatment according to the process of the invention, in a reactor within which said effluents are subjected to wet air oxidation, in the presence of a heterogeneous catalyst and optionally of a homogeneous catalyst and of at least one oxidising gas such as air or oxygen at a temperature of between approximately 20° C. and approximately 350° C. under a total pressure of between approximately 1 bar and approximately 160 bars. This is in no way a restrictive description of the invention in respect of the type of effluent, the formulation and conditions of use of the catalysts, nor of the conditions of use of the process representing the invention. Finally it will be noted that the process described in the present patent application is compatible with the process of wet air oxidation with internal recycling of solid residues described in French patent application n° 9403503 filed on Mar. 21, 1994 by the applicant.

We claim:

1. Process of aqueous phase oxidation of effluents containing organic matter and ammonia nitrogen comprising subjecting said effluents to oxidation in the presence of at least one oxidizing agent, at a temperature lying between approximately 20° C. and approximately 350° C. under a total pressure of between 1 bar and 160 bars in such manner as to mineralize part of the organic matter and total ammoniated nitrogen contained in said effluents, said oxidation being carried out inside a reactor in which a gaseous phase exists above the liquid phase made up of the effluents; and oxidizing the gaseous phase by positioning and stationing a heterogeneous catalyst above the interface between said gaseous phase and said liquid phase and inwardly of the walls of the reactor such that the heterogeneous catalyst is independent of the structure of the reactor itself.

2. Process in accordance with claim 1 characterised in that it is carried out at a temperature lying between approximately 200° C. and 350° C. under a total pressure of between approximately 20 bars and approximately 160 bars.

3. Process in accordance with claim 2, characterized in that it comprises a stage consisting of heating said heterogeneous catalyst to a higher temperature than the temperature of the effluents in the reactor.

4. Process in accordance with claim 1, characterized in that said heterogeneous catalyst is selected from taken from the group consisting of vanadium, niobium, chromium, molybdenum, tungsten, manganese, iron, cobalt, nickel, copper, cerium, platinum, rhodium, ruthenium, palladium and iridium and the mixtures and compounds of one or more of these.

5. Process in accordance with claim 1, characterized in that said catalyst is placed on a mineral support.

6. Process in accordance with claim 5, characterized in that said mineral support is chosen from the group made up of alumina, silica, zeolites, titanium dioxide and zirconium.

7. Process in accordance with claim 1, characterised in that said catalyst is in the form of a metallic honeycomb.

8. Process in accordance with claim 1, characterized in that the oxidising agent used for said oxidation is chosen from among air, oxygen enriched air, oxygen, ozone, hydrogen peroxide, peracids, gaseous chlorine, chlorine dioxide, sodium hypochlorite and potassium permanganate.

9. Process in accordance with claim 1, characterised in that oxidation is carried out in the presence of a gas flow within the reactor made up of at least one gas chosen from among air, oxygen enriched air, oxygen, ozone, steam or nitrogen gas.

10. Process in accordance with claim 1, characterized in that said aqueous phase oxidation is also carried out in the presence of a homogeneous catalyst intended to increase the efficacy of COR reduction.

11. Process in accordance with claim 10, characterized in that said homogeneous catalyst is a water-soluble compound of metals selected from the group consisting of manganese, iron, cobalt, nickel, copper, zinc and mixtures thereof.

12. Process in accordance with claim 11, characterized in that said catalyst is a soluble compound of copper or zinc or their mixture.

13. Process in accordance with claim 12, characterized in that said soluble compound of copper is copper sulphate.

14. Process in accordance with claim 11, characterized in that the mass ratio, catalyst metal/chemical requirements of oxygen (COR), of the effluent before treatment lies between 0.0005 and 0.3.

15. Process in accordance with claim 1, characterized in that the effluent treated comprises a solid phase, and in that it comprises a stage consisting of recycling at least part of the solid phase present in said oxidation reactor.

16. Process in accordance with claim 1, characterized in that the pH during the oxidization is maintained between 7–12.

17. Process in accordance with claim 1, characterized in that it consists of heating the area of the reactor, at the level at which said heterogeneous catalyst is positioned, to a higher temperature that that of the liquid effluent.

18. The process of claim 1 wherein the heterogeneous catalyst is a metal and is spaced and disposed inwardly of the wall structure that forms a part of the reactor.

19. Process in accordance with claim 18, characterized in that said heterogeneous catalyst is a metal taken from the group consisting of vanadium, niobium, chromium, molybdenum, tungsten, manganese, iron, cobalt, nickel, copper, cerium, platinum, rhodium, ruthenium, palladium and iridium and mixtures thereof.

20. The process of claim 1 wherein the reactor includes means for adjusting the position of the catalyst.

21. The process of claim 1 wherein the heterogeneous catalyst is disposed on a support that is spaced above the interface between the gaseous phase and said liquid phase and is spaced inwardly from the walls of the reactor and wherein the support is independent of the structure of the reactor itself.

22. The process of claim 21 wherein the support includes a basket and wherein the heterogeneous catalyst is in the form of pellets disposed within the basket.

23. The process of claim 22 wherein the basket is positioned such that portions of the gaseous phase move through the basket and react with the heterogeneous catalyst disposed within the basket.

* * * * *